United States Patent
Yamada

(10) Patent No.: US 7,305,033 B2
(45) Date of Patent: Dec. 4, 2007

(54) METHOD OF ENCODING AND DECODING MOTION PICTURE, MOTION PICTURE ENCODING DEVICE AND MOTION PICTURE DECODING DEVICE

(75) Inventor: Kunio Yamada, Yokohama (JP)

(73) Assignees: Telecommunications Advancement Organization of Japan, Tokyo (JP); Victor Company of Japan, Kanagawa (JP)

(*) Notice: Subject to any disclaimer, the term of this patent is extended or adjusted under 35 U.S.C. 154(b) by 815 days.

(21) Appl. No.: 10/684,832

(22) Filed: Oct. 15, 2003

(65) Prior Publication Data
US 2004/0161038 A1   Aug. 19, 2004

(30) Foreign Application Priority Data
Oct. 16, 2002  (JP) .............................. 2002-302298

(51) Int. Cl.
H04B 1/66     (2006.01)
H04N 7/12     (2006.01)
H04N 11/02    (2006.01)

(52) U.S. Cl. .................... 375/240.16; 375/240.12; 375/240.13; 375/240.15

(58) Field of Classification Search ............ 375/240.16
See application file for complete search history.

(56) References Cited

U.S. PATENT DOCUMENTS 5,991,447 A * 11/1999 Eifrig et al. ................ 382/236
6,252,975 B1 * 6/2001 Bozdagi et al. ............ 382/107

FOREIGN PATENT DOCUMENTS

| JP | 2000287212 | 10/2000 |
|---|---|---|
| WO | 0064148 | 10/2000 |
| WO | 0064167 | 10/2000 |

OTHER PUBLICATIONS

S. Zhu, et al.; "Region Competition: Unifying Snakes, Region Growing, and Bayes/MDL for Multibank Image Segmentation," IEEE Transactions on Pattern Analysis and Machine Intelligence, vol. 18, No. 9, Sep. 1996, pp. 884-900.

* cited by examiner

*Primary Examiner*—Chikaodili E Anyikire
(74) *Attorney, Agent, or Firm*—Stevens, Davis, Miller & Mosher, LLP

(57) ABSTRACT

The present invention discloses a method of encoding and decoding motion picture, a motion picture encoding device and a motion picture decoding device, which enables high-efficiency coding capable of avoiding the occurrence of any block distortion. According to the present invention, motion estimation and motion compensation are performed based on patches divided according to the textural characteristics, in combination with global motion compensation of unpredicted regions for unintentional non-prediction, which partially changes between the key frames to deal with double-image or frame-out problems.

4 Claims, 10 Drawing Sheets

MIDDLE FRAME

"SEEDS" FOR REGION COMPETITION

AFTER 20 ITERATIONS OF GROWING
AND COMPETITION

AFTER MERGING

4-CONNECTED FREEMAN CHAIN

KEY FRAME F

KEY FRAME B

FORWARD PREDICTED IMAGE
IN THE MIDDLE FRAME

BACKWARD PREDICTED
IMAGE IN THE MIDDLE FRAME

BI-DIRECTIONAL PREDICTED
IMAGE IN THE MIDDLE FRAME

PATCH MOTION
COMPENSATION ONLY

GLOBAL COMPENSATION BASED
ON THE PREVIOUS KEY FRAME F

GLOBAL COMPENSATION BASED ON
THE SUCCEEDING KEY FRAME B

PRESENT INVENTION

RESULT OF ENCODING

METHOD OF ENCODING AND DECODING MOTION PICTURE, MOTION PICTURE ENCODING DEVICE AND MOTION PICTURE DECODING DEVICE

BACKGROUND OF THE INVENTION

1. Technical Field of the Invention

The present invention relates to a method of encoding and decoding motion picture, a motion picture encoding device, and a motion picture decoding device.

2. Related Art

Conventional techniques of this type are known as H.261, H.263, MPEG-1, MPEG-2, MPEG-4, etc. Many techniques of motion picture coding including those cited are to perform key frame coding and motion vector estimation in units of blocks, the location and size of which are fixed. MPEG-4 allows the use of four vectors, but basically the vectors are used to just divide the blocks (for example, see Patent Document 1).

[Patent Document 1]

Japanese Patent Laid-Open No. 2000-287212 (FIG. 1 and Paragraph Nos. [0007] to [0015]).

In the case of the block-based encoding, if the amount of coding is insufficient or motion vector estimation ended in failure, it will cause a strong discontinuity on the boundary of blocks, so-called block distortion. The accuracy of motion vector estimation itself is also in question. In other words, since motion estimation is always performed in units of fixed-size blocks, if two or more objects are in motion in a block, right motion vectors may not be able to be determined. Even if a dominant motion vector is estimated correctly, the texture of an object originally having another motion vector in the block may be affected by the dominant motion vector. In this case, if the affected motion vector is used for motion compensation, a motion distortion may be caused.

SUMMARY OF THE INVENTION

The present invention has been made in view of the aforementioned problems in the conventional techniques, and it is an object the present invention to provide a method of encoding and decoding motion picture, a motion picture encoding device, and a motion picture decoding device, which perform non-block-based motion compensation to prevent the occurrence of block distortion within the area involved in the motion compensation.

In attaining the above object and according to the present invention, motion estimation and motion compensation are performed based on patches divided according to the textural characteristics. Also, according to the present invention, the motion compensation is performed in combination with global motion compensation that partially changes between key frames to deal with double-image or frame-out problems.

In other words, the present invention provides a method of encoding and decoding motion picture, which includes the steps of:

dividing a middle frame at about the midpoint between a previous key frame and a succeeding key frame in chronological order into a large number of patch-like regions according to its textural characteristics;

estimating forward and backward motion vectors based on the previous key frame and the succeeding key frame respectively for each of the region-divided patch images in the middle frame;

evaluating the reliability of each of the estimated forward and backward motion vectors to encode information on the motion picture including information on the previous and succeeding key frames, the patch images in the middle frame, the forward and backward motion vectors, and the reliability of each of the vectors;

decoding frames near the previous key frame by interpolating the forward motion vectors between the previous key frame and the patch images in the middle frame;

decoding frames near the succeeding key frame by interpolating the backward motion vectors between the patch images in the middle frame and the succeeding key frame; and decoding frames between the previous key frame and the succeeding key frame by interpolating either of the motion vectors that has higher reliability to compensate for their motion.

The present invention further provides a motion picture encoding device, which includes:

means for dividing a middle frame at about the midpoint between a previous key frame and a succeeding key frame in chronological order into a large number of patch-like regions according to its textural characteristics;

means for estimating forward and backward motion vectors based on the previous key frame and the succeeding key frame respectively for each of the region-divided patch images in the middle frame;

means for evaluating the reliability of each of the estimated forward and backward motion vectors; and means for transmitting the motion picture by encoding information on the previous and succeeding key frames, the patch images in the middle frame, the forward and backward motion vectors, and the reliability of each of the vectors.

DETAILED DESCRIPTION OF PREFERRED EMBODIMENTS

Figure 1:
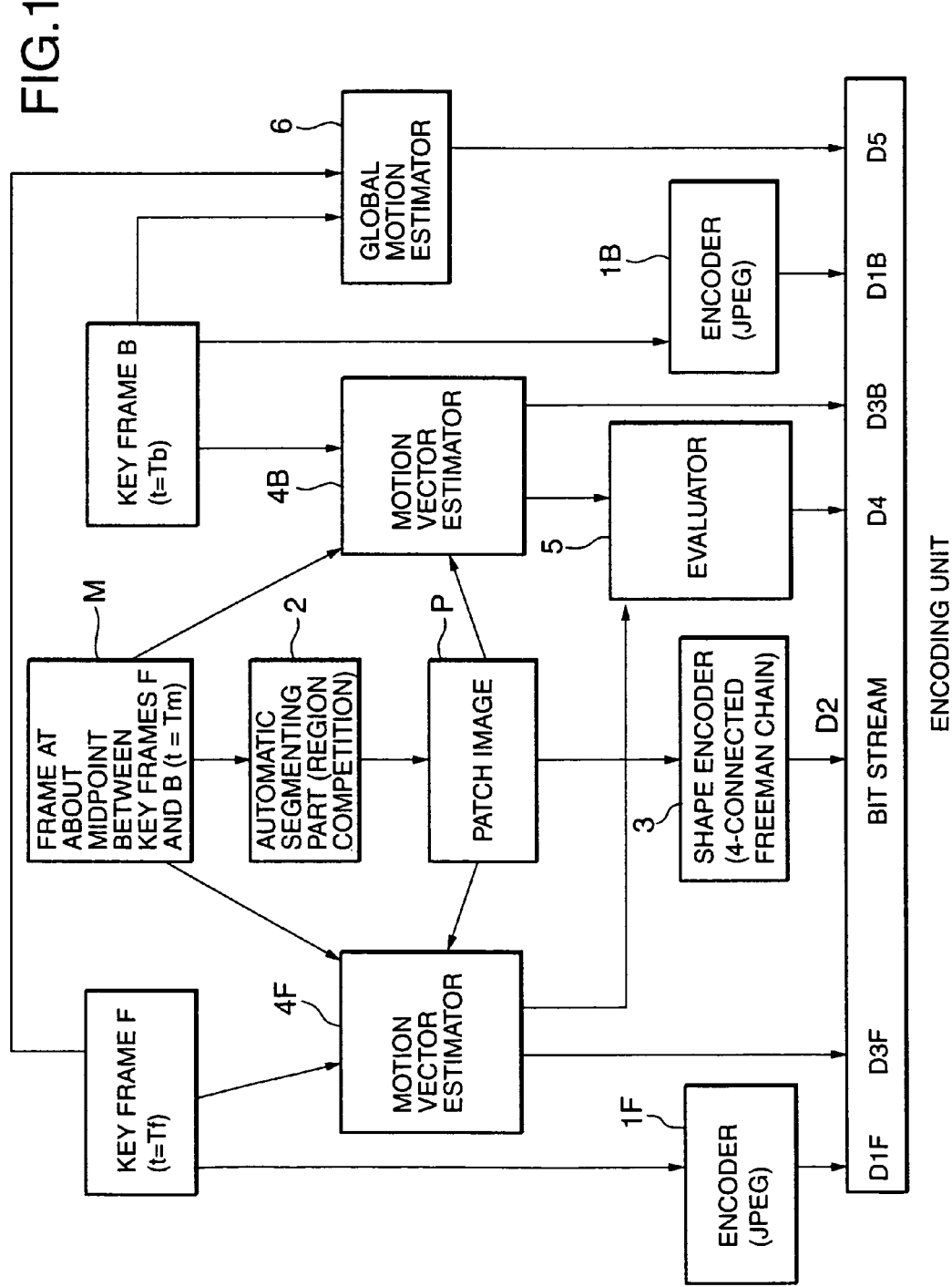
FIG. 1 is a block diagram showing a preferred embodiment of a motion picture encoding device according to the present invention.
Figure 2:
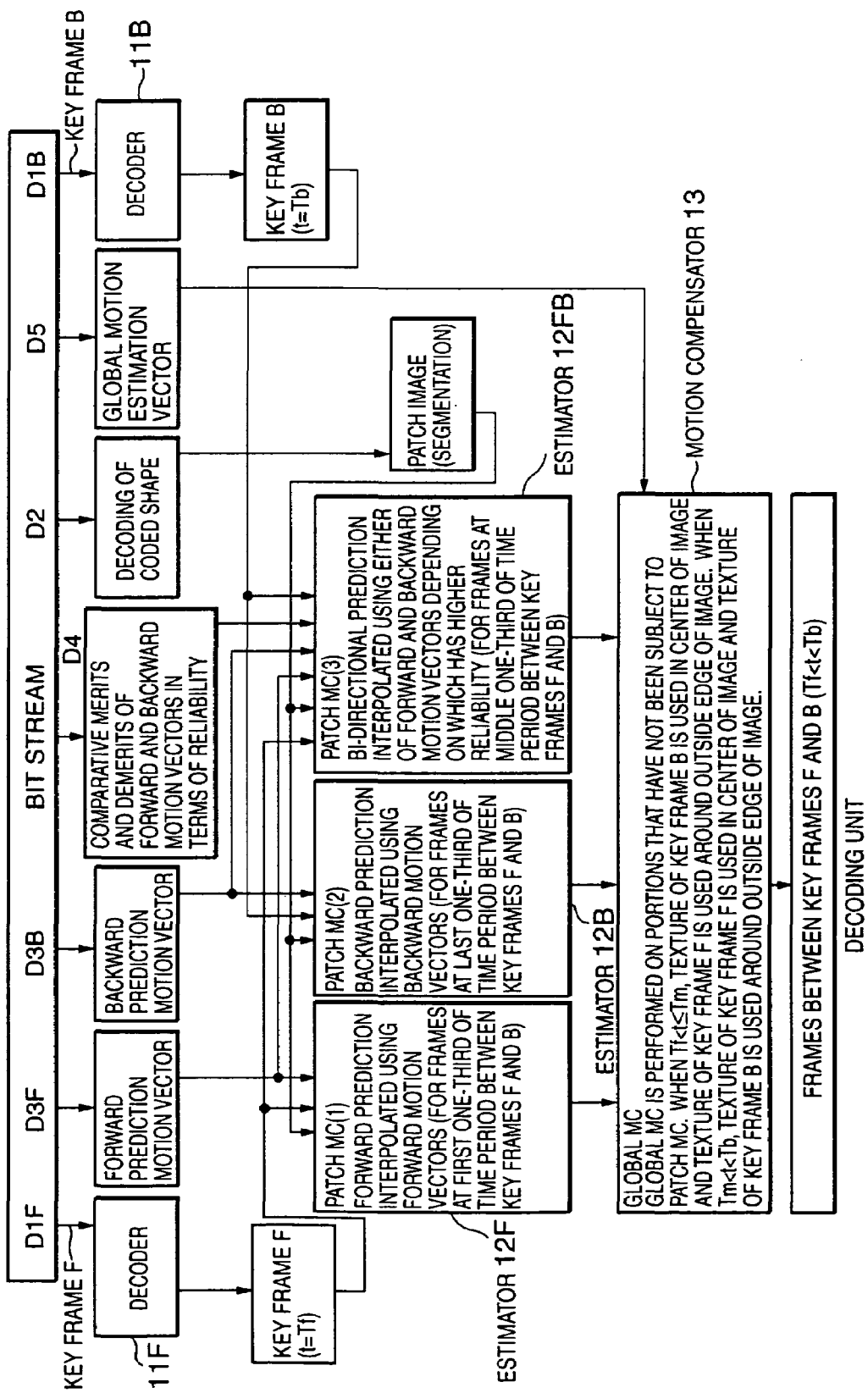
FIG. 2 is a block diagram showing a preferred embodiment of a motion picture decoding device according to the present invention.

Embodiments of the present invention will now be described with reference to the accompanying drawings. FIG. 1 is a block diagram showing an embodiment of a motion picture encoding device according to the present invention. FIG. 2 is a block diagram showing an embodiment of a motion picture decoding device according to the present invention.

The encoding device (encoding unit) shown in FIG. 1 uses key frames determined by an adequate, conventional method. The key frames that appear in chronological order are called a previous key frame F (t=Tf) and a succeeding key frame B (t=Tb), respectively. A frame at about the midpoint between the previous key frame F and the succeeding key frame B is called a middle frame M (t=Tm). Further, prediction from the previous key frame F is called forward prediction, prediction from the succeeding key frame B is called backward prediction, and prediction using both key frames is called bi-directional prediction.

Encoders 1F and 1B use an adequate, conventional encoding method (e.g., JPEG) to encode the previous key frame F and the succeeding key frame B, respectively, and transmit compressed data D1F and D1B as bit streams. An automatic segmenting part 2 divides the middle frame M into a large number of patch-like regions using a region competition method. Then, a shape encoder 3 performs 4-connected Freeman chain coding on the results (patch images) P of the region segmentation (data D2).

Further, motion vector estimators 4F and 4B perform (half-pel) motion vector estimation on each of the patch regions with different textures (luminance signals) in the middle frame M to estimate their motion vectors with respect to the previous and succeeding key frames F and B, respectively (data D3F and D3B). Here, an evaluator 5 encodes the data, including which of the forward prediction and the backward prediction has higher reliability (a higher degree of matching) than the other (data D4). Further, a global motion estimator 6 performs global motion estimation on the global motion between the previous frame F and the succeeding frames B to perform global motion compensation as a measure to prevent unintentional non-prediction due to patch motion compensation (data D5). In this encoding processing, frames between the previous and succeeding key frames F and B are compressed into the data D2, D3F, D3B, D4, and D5, and transmitted as bit streams.

In the decoding device (decoding unit) shown in FIG. 2, decoders 11F and 11B first decode the previous and succeeding key frames F and B, respectively, using a conventional technique. The frames, including the middle frame, between the previous and succeeding key frames F and B are compensated for patch motions by motion vectors interpolated according to the data on the texture and time of each of the key frames. For the patch motion compensation, a predictor 12F performs forward prediction on frames in about the following time range:

$$Tf < t < Tf + (Tb - Tf)/3$$

A predictor 12FB performs bi-directional prediction on frames in about the following time range:

$$Tf + (Tb - Tf)/3 \leq t < Tf + 2*(Tb - Tf)$$

A prediction 12B performs backward prediction on frames in about the following time range:

$$Tf + 2*(Tb - Tf) \leq t < Tb$$

It should be noted that higher reliable vectors are adopted for the bi-directional prediction.

A motion compensator (MC) 13 uses either of the key frames, upon which temporal interpolation of global motion has been performed, to compensate for unintentional non-prediction due to patch motion compensation. The use of which of the previous key frame F or the succeeding key frame B is determined as follows:

Succeeding Frame B for the center portion of the image in the time range of Tf<t≦Tm, Previous Frame F for the center portion of the image in the time range of Tm<t<Tb, Previous Frame F for the outside edge portion of the image in the time range of Tf<t≦Tm, and Succeeding Frame B for the outside edge portion of the image in the time range of Tm<t<Tb.

The reasons for the determination will be described later.

<About Each Part>

Automatic Segmenting Part 2 (Segmentation by Region Competition Method)

Region Competition method [S. C. Zhu and A Yuille, "Region competition: unifying snakes, region growing, and Bayee/MDL for multiband image segmentation," IEEE Transactions on Pattern Analysis and Machine Intelligence, Vol. 18, No. 9 (1996)] is a kind of method of optimizing energy functionals. In this method, among multiple adjacent regions, segments having the minimum MDL grow and the other segments shrink.

Figure 3:
FIG. 3 is an illustration showing a middle frame.

During growing or shrinking, the region competition is automatically controlled to prevent the boundary of regions from looking unnatural. This technique combines the advantage of the region growing/merging method with the advantage of the dynamic contour method. In this example, a grey scale model of the type that handles the luminance level as a normal distribution statistic is used. The following shows a region segmentation in the middle frame using the encoding technique concerned by way of example to describe the procedure according to the present invention. FIG. 3 and following figures show as an example a motion picture of a flower garden with a tree on the foreground and a house on the background.

Figure 4:
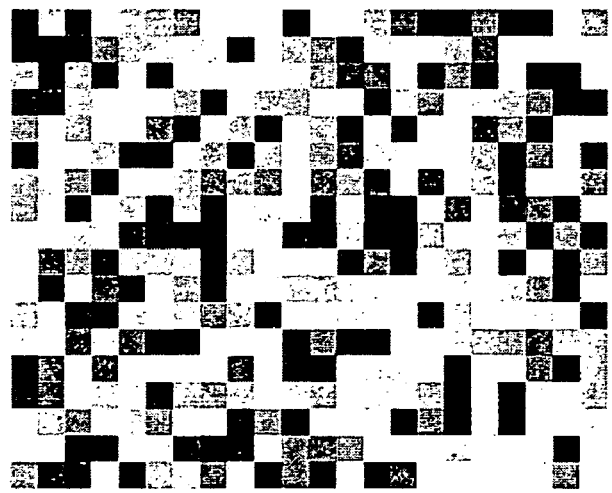
FIG. 4 is an illustration showing "seeds" for region competition in a middle frame in FIG. 3.

(1) For example, 16×16 seeds for region competition as shown in FIG. 4 are laid over the image in the middle frame as shown in FIG. 3. The reason for putting these seeds, rather than 80-pixel circular seeds and all background not occupied by any seed regions as in the original, is to enable fast segmentation (with fewer iterations).

Figure 5:
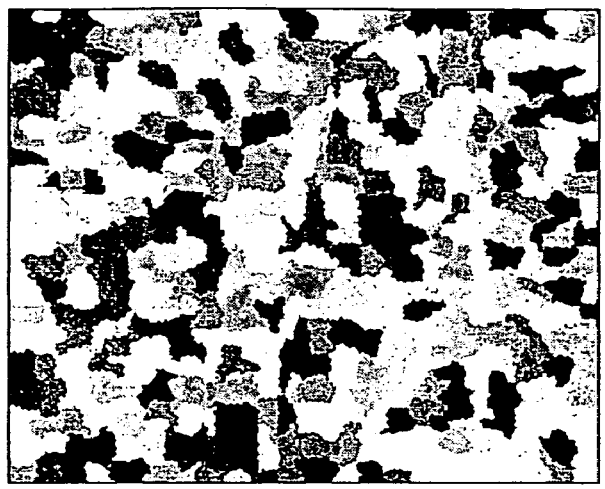
FIG. 5 is an illustration showing a state after 20 iterations of growing and competition of these seeds.

(2) FIG. 5 shows the outcome of 20 iterations of growing and competition of these seeds.

Figure 6:
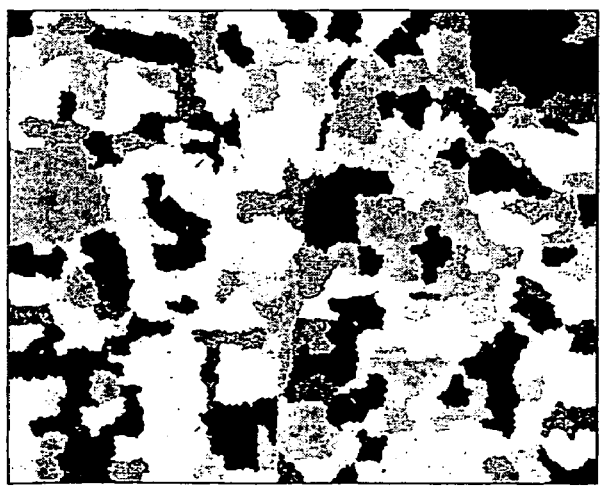
FIG. 6 is an illustration showing a state after merging.

(3) Under the assumption that contiguous and similar textures are in the same region, two contiguous regions are merged when the absolute value of the difference of average deviations of the two regions and the absolute value of the difference of standard deviations of the two regions are less than 10 and 35, respectively. FIG. 6 shows 252 regions reduced from 396 regions in FIG. 5. It should be noted that merging criteria are evaluated by comparing simple statistics, rather than through energy calculations in the original, wholly or mainly for the purpose of reducing the calculated amount.

Shape Coder 3 (4-Connected Freeman Chain)

As mentioned above, 4-connected Freeman chain coding is used to describe regions divided in the form of patches. The principle of the 4-connected Freeman chain coding is very simple. According to this principle, data on in which direction, up, down, left or right, it moves along the boundary of each pixel is coded from a starting point until it returns to the starting point.

Figure 7:
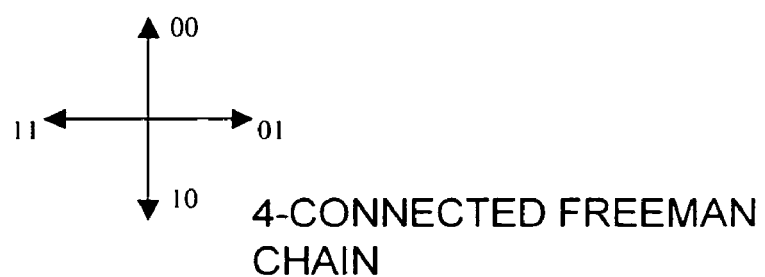
FIG. 7 is an illustration showing 4-connected Freeman chain coding.

As shown in FIG. 7, since the direction can be represented by two bits, the amount of coding necessary for the region-segmented patch image is determined by:

(Number of Regions)*{Number of Bits Necessary for Representation of Coordinates of Starting point (End point)}+(Total Path Length of Boundaries of All regions)/2

From a study of the total path length of the boundaries of all the regions based on the above results, 28850 was obtained. If the number of regions is 252 and the number of bits necessary for the representation of the coordinates of the starting point (end point) is 18, the amount of coding will be about 7.2 Kbytes.

Motion Estimation

Figure 8:
FIG. 8 is an illustration showing a previous key frame.
Figure 9:
FIG. 9 is an illustration showing a succeeding key frame.
Figure 10:
FIG. 10 is an illustration showing a forward predicted image in the middle frame.
Figure 11:
FIG. 11 is an illustration showing a backward predicted image in the middle frame.
Figure 12:
FIG. 12 is an illustration showing a bi-directional predicted image in the middle frame.

FIGS. 8 and 9 show the previous key frame F and the succeeding key frame B, respectively, when the camera has panned from left to right. The resulting images of the motion picture show a shift of the tree on the foreground to the left. FIG. 10 shows the result of forward predicting the middle frame M from the previous key frame F in FIG. 8, FIG. 11 shows the result of backward predicting the middle frame M from the succeeding key frame B in FIG. 9, and FIG. 12 shows the result of bi-directional prediction. From these results, it can be found that FIGS. 10 and 11 show that respective areas hidden behind the tree in FIGS. 8 and 9 are not reproduced, while FIG. 12 shows fewer prediction errors in the hidden areas because of the selective use of better results. Consequently, in the process of compensating for the motions of the patches, motion vectors are temporally interpolated based on forward prediction in the neighborhood of t=Tf, bi-directional prediction in the neighborhood of t=Tm, and backward prediction in the neighborhood of t=Tb.

Global Motion Compensation

As mentioned above, either the texture of the previous key frame F or the texture of the succeeding key frame B, upon which temporal interpolation of global motion has been performed, is used to compensate for unintentional non-prediction due to patch motion compensation according to the following criteria (1) to (4):

(1) Succeeding Frame B for the center portion of the image in the time range of Tf<t≦m, (2) Previous Frame F for the center portion of the image in the time range of Tm<t<Tb, (3) Previous Frame F for the outside edge portion of the image in the time range of Tf<t≦Tm, and (4) Succeeding Frame B for the outside edge portion of the image in the time range of Tm<t<Tb.

In the criteria, (2) and (4) are mirror phenomena of (1) and (3) because they are temporally symmetric about t=T. Therefore, the following describes (1) and (3) only.

Figure 13:
FIG. 13 is an illustration showing an image after subjected to patch motion compensation only.

FIG. 13 shows the result of patch motion compensation at t=5 when Tf=0, Tm=14, and Tb=29. In this case, since a marked portion in which part of the tree trunk looks overlapped on the background is a prediction error in the patch motion compensation, it will be omitted from the following discussion. Unintentional non-prediction can occur in an area in which there is no texture at any time point other than the time close to t=Tm (that is, when a foreground object has shifted) because the area was hidden behind the foreground object. Unintentional non-prediction can also occur in an area in which motion vectors are not reliable for prediction at t=Tm because the area was hidden behind a foreground object in the key frame (t=Tf or t=Tb; the latter in this case). In this case, the area corresponds to part of the background hidden behind the tree trunk in FIG. 8. In FIG. 13, the former is the left side of the tree trunk and the latter is the right side of the tree trunk.

Figure 14:
FIG. 14 is an illustration showing an image after subjected to global compensation based on the previous key frame.
Figure 15:
FIG. 15 is an illustration showing an image after subjected to global compensation based on the succeeding key frame.
Figure 16:
FIG. 16 is an illustration showing a decoded image according to the present invention.

On the other hand, when global motion compensation is performed based on the previous key frame F as shown in FIG. 14, excellent results related to the background can be obtained as a whole, but double images appear in marked portions. These phenomena are inevitable when the time of the previous key frame F (t=Tf=0) and the time of the current frame (t=5) are relatively close. FIG. 15 shows the result of global motion compensation using the succeeding key frame B (t=Tb=29) temporally away from the current frame. The quality of global motion compensation is a little bit poor, but instead the problem of double images is solved. However, due to the time difference, the succeeding key frame B (t=Tb=29) is too far to the right from the current frame (t=5), and therefore it cannot compensate for losses in the missing part of the image at the left edge of the screen. FIG. 16 shows the result in which, in view of these tradeoffs, the succeeding key frame B is used for prediction in the conspicuous center of the image and the previous key frame F is used for prediction around the edge of the image for the purpose of preventing part of the image at the edge from going missing. Under the present circumstances, since processing for prediction errors is not performed, this becomes the actual result of decoding.

Experimental Results

Figure 17:
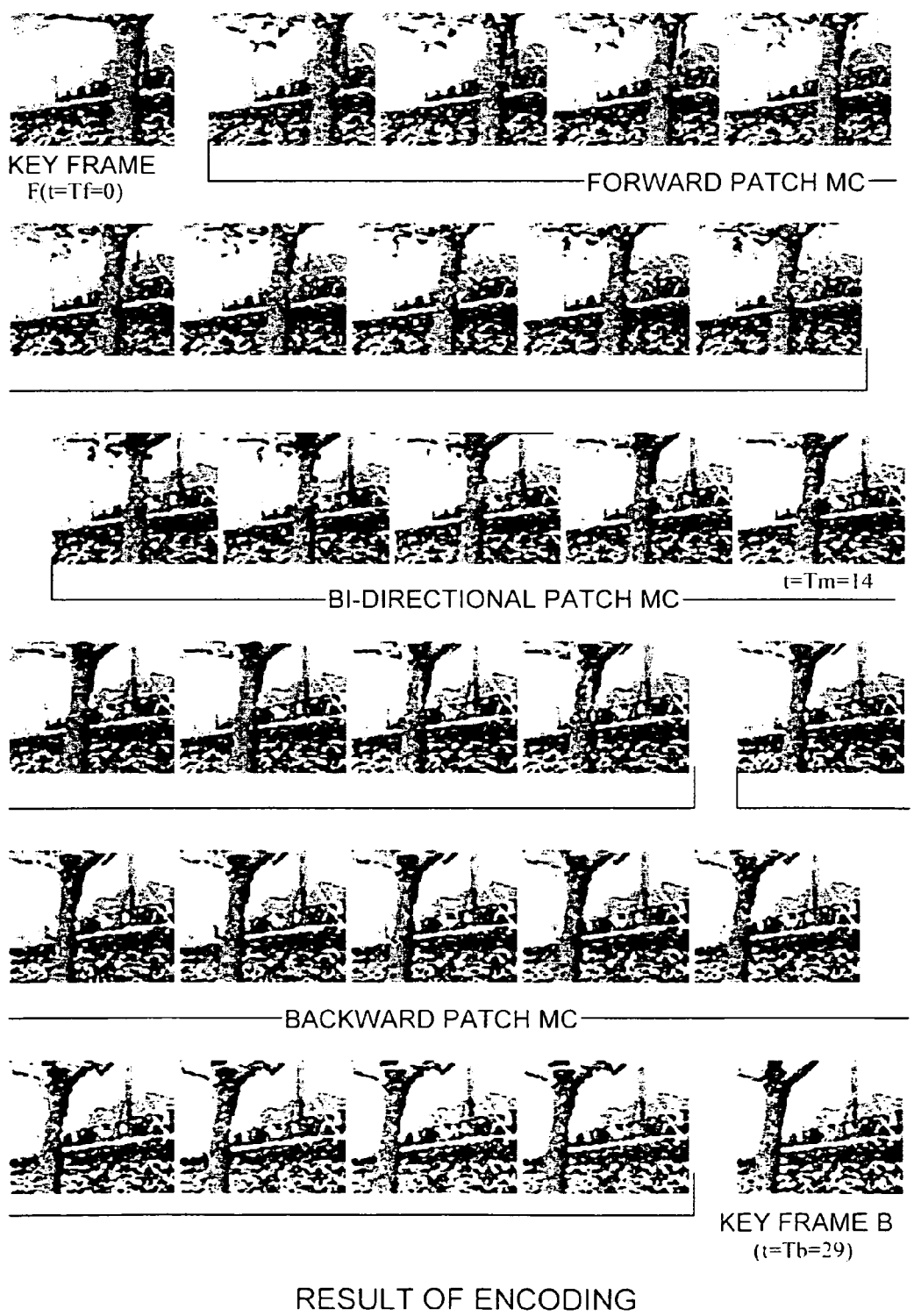
FIG. 17 is an illustration showing all decoded images of the motion picture according to the present invention.

While in the above description some of results were also put down, the following provides not only an overview of the procedure within the time period from t=Tf=0 to t=Tb=29, but also a brief overview of how to calculate the bit rate. FIG. 17 shows 30 frames as a result of decoding together with the directions of patch motion compensation. The bit rate per second is determined from the following necessary data sizes:

One key frame having a file size of just under 40 Kbytes.

With respect to the middle frame (t=Tm), patch segmentation information is about 7.2 Kbytes as shown at 3.2, and information on bi-directional vectors of 252 regions and which directional vectors have higher reliability is 1 Kbyte or less in size at the maximum.

One global motion vector (almost zero compared to the above information).

As a result, it is expected that the total data size will be 50 Kbytes/sec. or smaller, that is, the amount of coding will be about 400 bps or less. In the example of the flower garden studied above, it is found that the CIF (352×288) video with 30 fps needs a coding rate of 400-Kbps or less.

As described above, according to the present invention, motion estimation and motion compensation are performed based on the patches divided according to the textural characteristics, in combination with global motion compensation of unpredicted regions for unintentional non-prediction, which partially changes between the key frames to deal with double-image or frame-out problems. It enables high-efficiency coding capable of avoiding the occurrence of block distortion appearing in the conventional techniques.

What is claimed is:

1. A method of encoding and decoding a motion picture comprising the steps of:
   dividing a middle frame at about the midpoint between a previous key frame and a succeeding key frame in chronological order into a large number of patch-like regions according to its textural characteristics;
   estimating forward and backward motion vectors based on the previous key frame and the succeeding key frame respectively for each of the region-divided patch images in the middle frame;
   evaluating the reliability of each of the estimated forward and backward motion vectors to encode information on the motion picture including information on the previous and succeeding key frames, the patch images in the middle frame, the forward and backward motion vectors, and the reliability of each of the vectors;
   decoding frames near the previous key frame by interpolating the forward motion vectors between the previous key frame and the patch images in the middle frame;
   decoding frames near the succeeding key frame by interpolating the backward motion vectors between the patch images in the middle frame and the succeeding key frame;
   decoding frames between the previous key frame and the succeeding key frame by interpolating either of the motion vectors that has higher reliability to compensate for their motion; and
   encoding the motion picture by estimating a global motion between the previous key frame and the succeeding key frame,
   decoding the center portion of an image in each of frames previous to the middle frame using the texture of the succeeding frame in accordance with a result of the global motion estimation when unintentional non-prediction occurs in the patches,
   decoding the outside edge portion of the image in each of frames previous to the middle frame using the texture of the previous frame in accordance with a result of the global motion estimation when unintentional nonprediction occurs in the patches,
   decoding the center portion of the image in each of frames subsequent to the middle frame using the texture of the previous frame in accordance with a result of the global motion estimation when unintentional non-prediction occurs in the patches, and
   decoding the outside edge portion of the image in each of frames subsequent to the middle frame using the texture of the succeeding key frame in accordance with a result of the global motion estimation when unintentional non-prediction occurs in the patches.

2. An apparatus for encoding and decoding a motion picture, said apparatus comprising:
   a divider that divides a middle frame at about the midpoint between a previous key frame and a succeeding key frame in chronological order into a large number of patch-like regions according to its textural characteristics;
   an estimator that estimates forward and backward motion vectors based on the previous key frame and the succeeding key frame respectively for each of the region-divided patch images in the middle frame;
   an evaluator that evaluates the reliability of each of the estimated forward and backward motion vectors to encode information on the motion picture including information on the previous and succeeding key frames, the patch images in the middle frame, the forward and backward motion vectors, and the reliability of each of the vectors;
   a first decoder that decodes frames near the previous key frame by interpolating the forward motion vectors between the previous key frame and the patch images in the middle frame;
   a second decoder that decodes frames near the succeeding key frame by interpolating the backward motion vectors between the patch images in the middle frame and the succeeding key frame;
   a third decoder that decodes frames between the previous key frame and the succeeding key frame by interpolating either of the motion vectors that has higher reliability to compensate for their motion; and
   an encoder that further encodes the motion picture by estimating a global motion between the previous key frame and the succeeding key frame,
   a fourth decoder that decodes the center portion of an image in each of frames previous to the middle frame using the texture of the succeeding frame in accordance with a result of the global motion estimation when unintentional nonprediction occurs in the patches,
   a fifth decoder that decodes the outside edge portion of the image in each of frames previous to the middle frame using the texture of the previous frame in accordance with a result of the global motion estimation when unintentional nonprediction occurs in the patches,
   a sixth decoder that decodes the center portion of the image in each of frames subsequent to the middle frame using the texture of the previous frame in accordance with a result of the global motion estimation when unintentional non-prediction occurs in the patches, and
   a seventh decoder that decodes the outside edge portion of the image in each of frames subsequent to the middle frame using the texture of the succeeding key frame in accordance with a result of the global motion estimation when unintentional non-prediction occurs in the patches.

3. A method of encoding and decoding a motion picture, said method comprising the steps of:
   dividing a middle frame at about the midpoint between a previous key frame and a succeeding key frame in chronological order into a large number of patch-like regions according to its textural characteristics;
   estimating forward and backward motion vectors based on the previous key frame and the succeeding key frame respectively for each of the region-divided patch images in the middle frame;
   encoding the motion picture by estimating a global motion between the previous key frame and the succeeding key frame,
   decoding the center portion of an image in each of frames previous to the middle frame using the texture of the succeeding frame in accordance with a result of the global motion estimation when unintentional non-prediction occurs in the patches,
   decoding the outside edge portion of the image in each of frames previous to the middle frame using the texture of the previous frame in accordance with a result of the global motion estimation when unintentional nonprediction occurs in the patches,
   decoding the center portion of the image in each of frames subsequent to the middle frame using the texture of the previous frame in accordance with a result of the global motion estimation when unintentional non-prediction occurs in the patches, and decoding the outside edge portion of the image in each of frames subsequent to the middle frame using the texture of the succeeding key frame in accordance with a result of the global motion estimation when unintentional nonprediction occurs in the patches.

4. An apparatus for encoding and decoding a motion picture, said apparatus comprising:

a divider that divides a middle frame at about the midpoint between a previous key frame and a succeeding key frame in chronological order into a large number of patch-like regions according to its textural characteristics;

an estimator that estimates forward and backward motion vectors based on the previous key frame and the succeeding key frame respectively for each of the region-divided patch images in the middle frame;

an encoder that encodes the motion picture by estimating a global motion between the previous key frame and the succeeding key frame, a first decoder that decodes the center portion of an image in each of frames previous to the middle frame using the texture of the succeeding frame in accordance with a result of the global motion estimation when unintentional nonprediction occurs in the patches, a second decoder that decodes the outside edge portion of the image in each of frames previous to the middle frame using the texture of the previous frame in accordance with a result of the global motion estimation when unintentional non-prediction occurs in the patches, a third decoder that decodes the center portion of the image in each of frames subsequent to the middle frame using the texture of the previous frame in accordance with a result of the global motion estimation when unintentional non-prediction occurs in the patches, and a fourth decoder that decodes the outside edge portion of the image in each of frames subsequent to the middle frame using the texture of the succeeding key frame in accordance with a result of the global motion estimation when unintentional non-prediction occurs in the patches.

* * * * *